US008321680B2

(12) United States Patent
Gantman et al.

(10) Patent No.: US 8,321,680 B2
(45) Date of Patent: Nov. 27, 2012

(54) MULTISIGNING—A PROTOCOL FOR ROBUST MULTIPLE PARTY DIGITAL SIGNATURES

(75) Inventors: Alexander Gantman, Poway, CA (US); Aram Perez, San Diego, CA (US); Gregory G. Rose, San Diego, CA (US); Laurence G. Lundblade, San Diego, CA (US); Matthew W. Hohfeld, San Diego, CA (US); Michael W. Paddon, Tokyo (JP); Oliver Michaelis, San Diego, CA (US); Ricardo Jorge Lopez, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/964,213

(22) Filed: Dec. 9, 2010

(65) Prior Publication Data

US 2011/0107107 A1   May 5, 2011

Related U.S. Application Data

(62) Division of application No. 11/182,293, filed on Jul. 15, 2005, now abandoned.

(60) Provisional application No. 60/667,512, filed on Mar. 31, 2005, provisional application No. 60/693,456, filed on Jun. 22, 2005.

(51) Int. Cl.
*H04L 9/32* (2006.01)

(52) U.S. Cl. ........ 713/176; 713/171; 713/172; 713/173; 713/174; 713/175; 713/177; 713/178; 713/179; 713/180; 713/181; 713/189; 713/156; 713/157; 713/158; 380/277; 380/278; 380/279; 380/280; 380/281; 380/282; 380/283; 380/284; 380/285; 380/286

(58) Field of Classification Search .................. 713/167, 713/185, 189, 156–158, 171–181; 380/277–286
See application file for complete search history.

(56) References Cited

U.S. PATENT DOCUMENTS 6,367,013 B1   4/2002   Bisbee et al.
(Continued)

FOREIGN PATENT DOCUMENTS

JP   11506222 T   6/1999
(Continued)

OTHER PUBLICATIONS

International Search Report and Written Opinion—PCT/US2006/012361, International Search Authority—European Patent Office—Jul. 2, 2007.

(Continued)

*Primary Examiner* — Thanhnga B Truong
(74) *Attorney, Agent, or Firm* — Won Tae Kim

(57) ABSTRACT

Embodiments describe a system and/or method for multiple party digital signatures. According to a first aspect a method comprises establishing a first validity range for a first key, establishing a first validity range for at least a second key, and determining if the validity range of the first key overlaps the first validity range of the at least a second key. A certificate is signed with the first validity range of the first key and the first validity range of the at least a second key if the validity ranges overlap. According to another embodiment, signage of the certificate is refused if the first validity range of the first key does not overlap with the first validity range of the at least a second key.

22 Claims, 11 Drawing Sheets

U.S. PATENT DOCUMENTS

| | | | |
|---|---|---|---|
| 6,393,563 B1 | 5/2002 | Maruyama et al. | |
| 6,898,707 B1* | 5/2005 | Sit et al. | 713/167 |
| 7,028,185 B2 | 4/2006 | Wheeler et al. | |
| 7,178,023 B1 | 2/2007 | Ganapathy | |
| 7,353,396 B2* | 4/2008 | Micali et al. | 713/176 |
| 2002/0013898 A1 | 1/2002 | Sudia et al. | |
| 2003/0078880 A1 | 4/2003 | Alley et al. | |
| 2004/0250101 A1 | 12/2004 | Kanai | |
| 2005/0262354 A1 | 11/2005 | Komano | |
| 2006/0047951 A1* | 3/2006 | Reilly et al. | 713/158 |

FOREIGN PATENT DOCUMENTS

| | | |
|---|---|---|
| JP | 11174956 A | 7/1999 |
| JP | 2000115160 A | 4/2000 |
| JP | 2000235340 A | 8/2000 |
| JP | 2002290396 A | 10/2002 |
| JP | 2003244137 A | 8/2003 |
| JP | 2004304227 A | 10/2004 |
| JP | 2005522937 T | 7/2005 |
| KR | 1020010002579 | 1/2001 |
| KR | 1020010048947 | 6/2001 |
| KR | 199922451 | 1/2002 |
| KR | 1020020016629 | 3/2002 |
| WO | WO03030533 A1 | 4/2003 |

OTHER PUBLICATIONS

Menez, Oorschot Vanstone, "Handbook of Applied Cryptography," CRC Press Series on Discrete Mathematics and Its Applications, 1997, Chapter 10, pp. 498-499 and Chapter 12, pp. 397-400, XP002412962.

Menezes, Vanstone, Oorschot: "Handbook of applied Cryptography" 1997, CRC Press LLC, USA, XP002438454. pp. 399-400, 524-527, 572, 576-583.

N.-Y. Lee, "Threshold signature scheme with multiple signing policies," IEE Proceedings Computers & Digital Technologies, Mar. 2001, vol. 148, Issue 2, pp. 95-99.

* cited by examiner

MULTISIGNING—A PROTOCOL FOR ROBUST MULTIPLE PARTY DIGITAL SIGNATURES

CLAIM OF PRIORITY UNDER 35 U.S.C. §120

The present Application for Patent is a divisional of application Ser. No. 11/182,293, filed Jul. 15, 2005, incorporated by reference herein, which claims priority to Provisional Application No. 60/667,512 entitled "Method and System for Managing Robust Multiple Party Digital Signatures", filed Mar. 31, 2005 and to Provisional Application No. 60/693,456 entitled "Multisigning—A Protocol for Robust Multiple Party Digital Signatures," filed Jun. 22, 2005, both assigned to the assignee hereof and hereby expressly incorporated by reference herein.

BACKGROUND

I. Field

The following description relates generally to data protection and more particularly to multiple party digital signatures.

II. Background

When a mobile device downloads data (or has data pushed to it in some fashion), it makes an assessment of such data's trustworthiness. This is particularly important for executable data or code, for example. Conversely, if an attacker can convince a device that malicious data is trustworthy such attacker has a way of subverting the device's integrity.

The creation of digital signatures by use of public key techniques is typically utilized to ensure trustworthiness of data. Typically, a private key is used to generate a signature, the authenticity of which may then be verified by using the conjugate public key. Public keys are commonly transmitted and stored in certificates, which bear the key itself and associated validity and policy meta-information, and which are signed by a higher order certification authority. The public key of each certification authority may also be stored in a certificate, thereby implying a chain of trust and a certification hierarchy.

A private key is compromised whenever it is disclosed to unauthorized parties or used in an unauthorized way. Once a key is compromised, the chain of trust is broken. Additionally, a private key may be lost, and therefore rendered unusable. In both scenarios, the key should be revoked, and a new key generated.

If a single key is used to sign blocks of data, then a single compromise will allow an attacker to exploit the system. If the signer becomes aware of the compromise, then the key may be revoked. However, there are isolated environments (such as bootstrap loaders) that may not have real-time access to certificate revocation information. Furthermore, if the compromise occurs because the signer has "turned rogue," there is no effective countermeasure.

Once a mobile device has been compromised, it may not, or it may be difficult to, be returned to a trustworthy state without physical access to the device. In the case of cell phones, for example, the cost of recalling devices after a widespread security breach is immense. Furthermore, the attacker may be in physical possession of the device and thus has no motivation to return the device to a trustworthy state.

Therefore, a high-level assurance of the trustworthiness of data on a mobile device, at not only download time but also whenever it is used, is needed. While contemporary digital signature techniques go some way to solving this problem, they do not provide the necessary assurance under certain conditions. For example, when a mobile device is booting it has no access to a network and hence no access to revocation information, however the integrity of the bootstrap mechanism is fundamental.

In addition, there are multiple legitimate stakeholders involved in determining what data should be trusted by a mobile device. Assurance mechanisms need to account for multiple authorities, and furthermore account for the case where an authority acts improperly.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

According to an aspect of the invention is a method of verifying multiple party digital signatures. The method includes signing a block of data by multiple parties, verifying the block of data with a correct number of verified signatures, and determining if the number of verified signatures satisfies a verification policy.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

GLOSSARY OF TERMS

Blob—Refers to a block of data to be signed.

Certificate—A public key and associated annotations, signed by a certification authority.

Compromise—Refers to unauthorized use, or potential unauthorized use, of a private key.

Digital Signature—A unique digest of a blob, computed using the private key of the signer.

Multisigning—A protocol whereby multiple parties independently sign a blob in such a way that the blob can be verified without certificate revocation information.

OpenPGP—The web of trust public key certificate standard.

Private Key—Refers to a secret half of a public key pair, typically used to generate signatures.

Public Key—Refers to a publishable half of a public key pair, typically used to verify signatures.

Revocation—Refers to a notification that a key is no longer to be trusted.

Validity Range—The contiguous time frame for which a certificate is nominally valid.

X.509—A hierarchical public key certificate standard.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
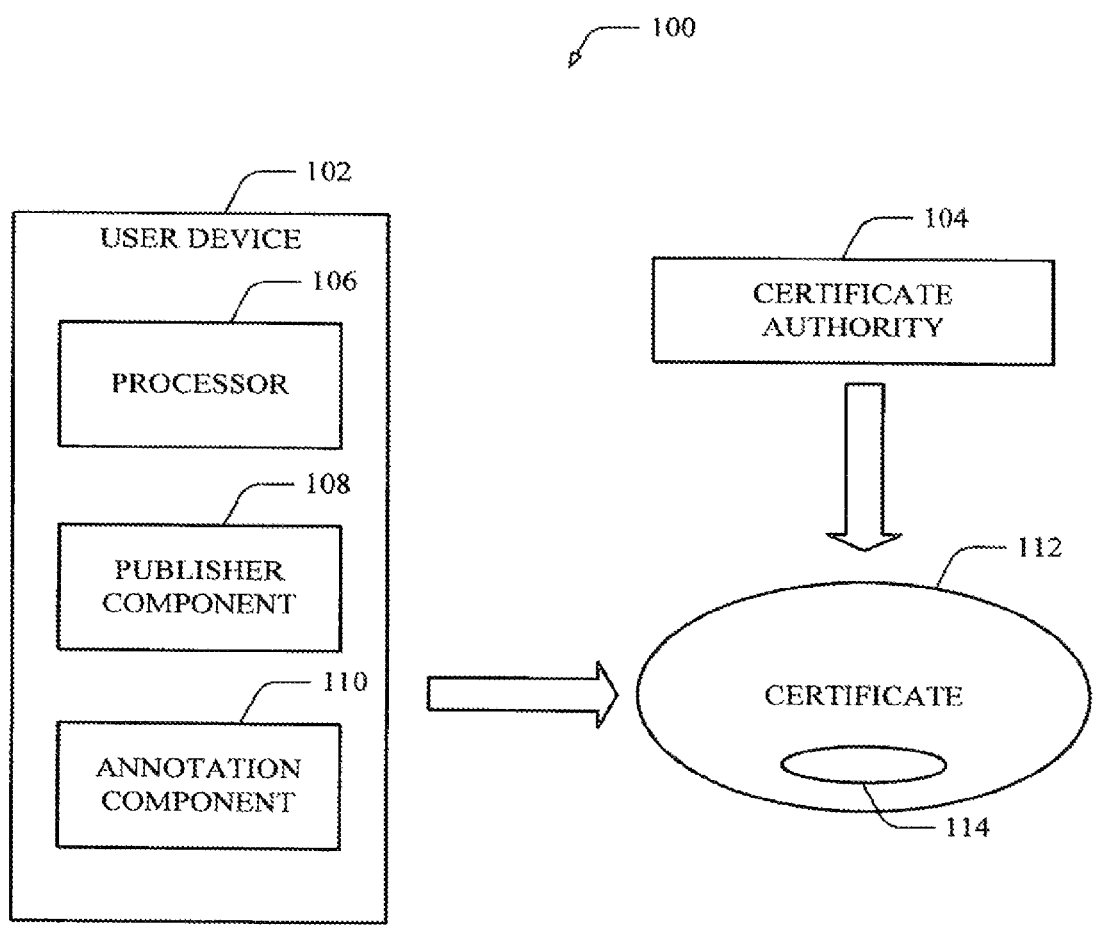
FIG. 1 is a block diagram of a digital signature system.

With reference now to the drawings, FIG. 1 is a block diagram of a system 100 that provides a digital signature. A digital signature is a way of authenticating that data is received from the true originator and that the data is trustworthy. System 100 includes a user device 102 and a certificate authority 104. User device 102 may be implemented in a portable device, a portable phone, a personal data assistant, a personal computer (desktop or laptop), a moving vehicle (autos, trucks, ships, etc.), or other electronic devices. Certificate authority 104 may be implemented by entities such as banks, cellular service providers, security service providers, or other trusted third parties. Although only one certificate authority 104 is shown, it should be appreciated that there may be one or more certificate authorities.

User device 102 includes a processor 106 that generates cryptographic keys, a publisher component 108 that publishes a certificate 112, and an annotation component 110 that annotates the published certificate with necessary information. Cryptographic keys include a private key and a corresponding public key. The private key is usually retained in user device 102 to maintain such key's secrecy while the public key is published and utilized for verification purposes and stored in certificates.

Publish component 108 allows the owner of user device 102 to publish a certificate 112 containing an associated public key 114. Public-key certificate 112 is a digitally signed statement that certifies or validates that the public key belongs to the sender and associates a level of confidence or trustworthiness to the information. Certificate authority 104 may also sign certificate 112.

Annotation component 110 annotates public key 114 with a start timestamp and an end timestamp, or validity range. Public key 114 is valid only during such validity range. It is not necessary that the timestamps be related to real time, although they may be. The validity range could be a numbered sequence or a range that is generated by a hash function. The range can be temporal-based, numerical-based, or based on any other criteria, provided there is a system and/or method for determining when the validity range starts and ends. For example, time can be utilized as part of the X.590 standard. The X.509 standard defines the information that can go into a particular certificate and describes the data format of the certificate. It should be noted that the various embodiments described herein could be implemented by a plurality of public key certification standards, including X.509 and OpenPGP, which support validity ranges and revocation mechanisms.

User device 102 can generate a sequence of keys and certificates for a given purpose over time. Successive keys replace those keys that have expired or that have been revoked. However, each key should have a validity range that is disjoint from the validity range of each preceding and successive key. In other word, no validity ranges should overlap. For example, a first validity range starts on January 1 and ends on January 7, if a second validity range starts on January 8 and ends on January 13 they are disjoint. However, if the second validity range begins on January 6, it is invalid and cannot be associated with the first validity range because the validity ranges are joined.

Each key is only to be utilized for the pre-determined lifetime (validity range). This allows for regular expiration of keys and is generally unrelated to a timestamp of certificate 112. The validity range of the key does not have to be contained in certificate 112, although it can be included in certificate 112. Additionally, validity range of the key may not be determinable from the timestamp of the certificate.

If a private key, stored in user device 102, is expired, it should be destroyed to reduce the chances of the old keys being compromised. New signing keys are generated to replace expired keys and can be created on or before the time of expiration.

Figure 2:
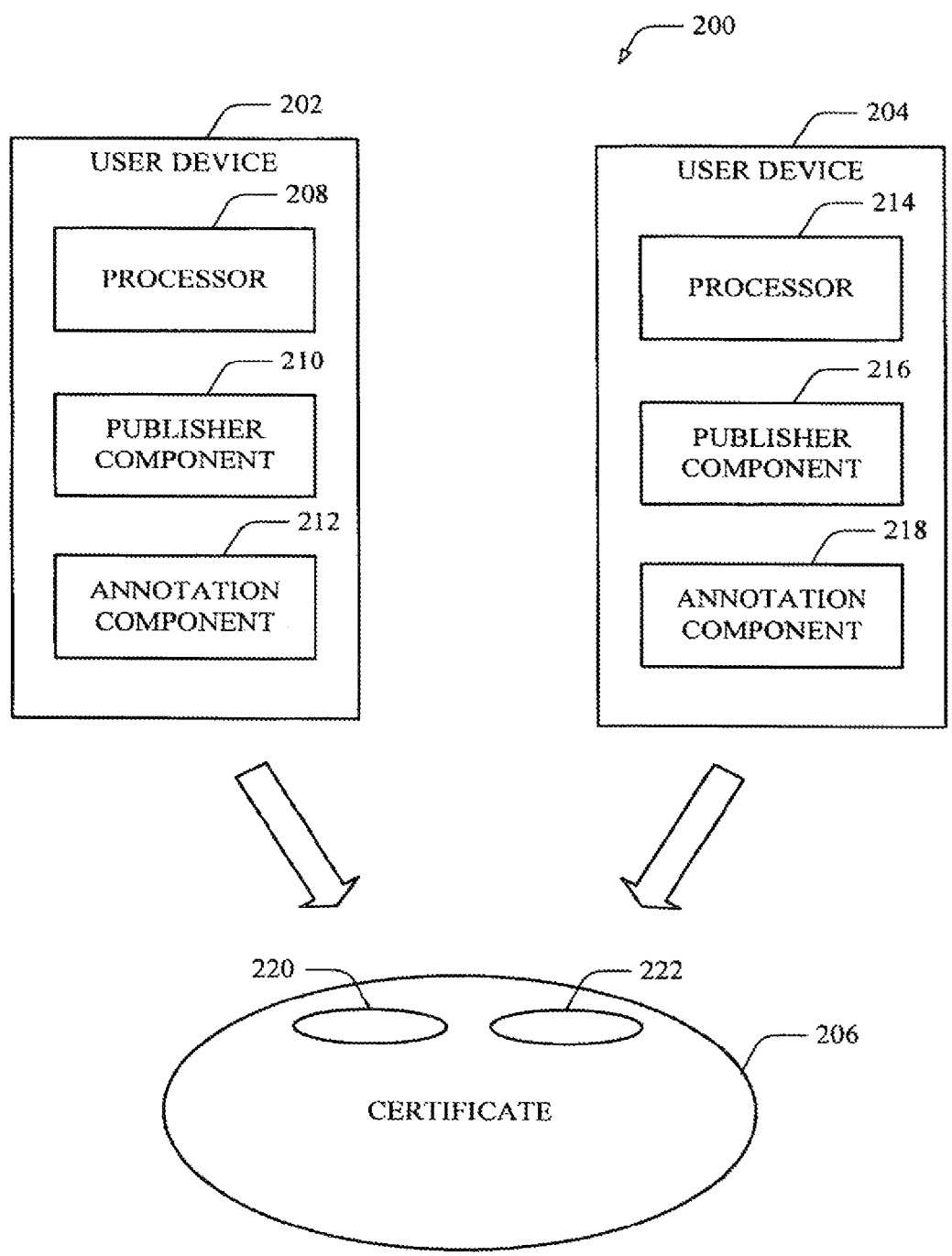
FIG. 2 is a block diagram of a multiple party signatures system.

Referring now to FIG. 2, a block diagram of a multiple party digital signature system 200 is illustrated. System 200 includes a first user device 202 and a second user device 204 and a certificate 206 signed by first and second user devices 202 and 204 and/or a certificate authority (not shown). While only two user devices are shown, it will be understood by those skilled in the art that there may be more than two devices. Each user device includes respective processors 208 and 214 that generate cryptographic keys, publish components 210 and 216 that publish a certificate for multiple party digital signatures, and annotate components 212 and 218 that annotate information to the certificate.

Multiple parties, through respective user devices 202 and 204, digitally sign certificate 206 to allow for an assessment of trustworthiness of data when that data is to be downloaded or utilized by a user. The certificate published by respective user devices 202 and 204 contain respective public keys 220 and 222 with a validity range that includes a start timestamp and an end timestamp. The timestamp associated with public key 220 does not have to be identical to the time stamp of public key 222. However, each respective validity range should overlap. For example, if public key 220 has a validity range from Monday to Wednesday and public key 222 has a validity range from Monday to Thursday, there is sufficient overlap. However, if public key 222 has a validity range from Thursday to Friday, the overlap is not sufficient.

There are several ways a certificate can be signed with more than one signature, known as multisigning. A few multisigning techniques are cosigning, countersigning, and cross signing and will be briefly discussed.

The most basic form of multisigning is cosigning. In cosigning, there is a signature of first key "A" with a message on it and a signature of second key "B" with a message on it. When cosigning is used, each party is independent, that is, each party is not aware that the other party is signing the certificate.

$$Sig_A(m), Sig_B(m)$$

Another type of multisigning is countersigning. This is typically used on digital authorization services, such as a commercial service. There is a signature of A with a message, and a signature of B with a message, off the signature and message of A. Essentially, B is attesting to the fact that A signed the message.

$$Sig_A(m), Sig_B(m, Sig_A(m))$$

Cross signing is another type of multisigning where there is a signature of A with a message and an indicator that B should also sign. Essentially, what it indicates is that A is going to sign the message and knows it should also be signed by B. A is further concluding that A's signature is optional.

$$Sig_A(m, [A], B)$$

B would also sign a signature, similar to that described with reference to A above, concluding B's signature is optional.

$$Sig_A(m, A, [B])$$

While A does not have to include [A] and B does not have to include [B], including such indications provides that the actual content both A and B sign are the same. Having the same content is a verification issue. If A and B do not include themselves, the respective signatures would be as indicated below.

$$Sig_A(m, B)$$

$$Sig_A(m, A)$$

While the above are examples of multisigning, a plurality of multiple party signature schemes can be utilized according to the embodiments disclosed herein.

Each blob, or block of data, is signed by multiple parties, thereby creating a signature set of <n> signatures. Each signature is independent and may be generated in any order, or even at a substantially similar time.

To verify a blob, each <n> signature is independently verified by using the appropriate certificate. The number of correctly verified signatures is defined as <v>, where <v> is greater than or equal to zero and less then or equal to <n>:

$$0 \leq <v> \leq <n>$$

The minimum number of correct signatures that will satisfy the verification policy is defined as <m>. That is, not every verified signature, <v>, need to be retrieved to satisfy verification policy. Verification succeeds when <v> is greater than or equal to <m> guaranteeing that at least <m> signers have independently verified the blob.

$$<v> \geq <m>$$

Additionally the intersection of the valid time windows of the <v> certificates is a non-zero range. This guarantees that at the time each signature was generated, no revocation notice of one or more of the other keys had been received by the signer or user device. In some embodiments, the verification of the intersection of the valid time windows of the <v> certificates is performed by a verifier (e.g., verifier device).

In a simple case where the minimum number of correct signatures that will satisfy the verification policy, <m>, is equal to the number of signatures that signed the blob, <n>, all signatures need to be correct. This is expressed as:

$$<m> = <n>$$

This provides maximal assurance. However, it also means that a single revocation prevents further signing until the <n> signers have regenerated keys. More generally, the condition is less stringent when the minimum number of correct signatures that will satisfy the verification policy, <m>, is less than the number of signatures that signed the blob, <n>.

$$<m> < <n>$$

In this case, the protocol permits there to be a number of contemporaneous revocations equal to the number of signatures <n> minus the number of <m> correct signatures without preventing further signing from taking place.

$$(<n> - <m>)$$

Verification does not necessitate access to a particular type of time keeping, as the time comparisons are relative and the timestamps are against an arbitrary time base. However, a verifier (e.g., verifier device) may choose to apply real time constraints as part of its policy if the timestamps are defined to be relative to real time, or if additional time information is carried in the certificate.

Whenever a key is revoked, the signers should regenerate new keys that do not overlap with the revoked key, known as compromise recovery. For example, at substantially the same time as there is one more signer than the total number of signatures, <n>, minus the number of <m> signers, overlapping keys are revoked, and a new key is generated to allow signing to continue.

$$(<n> - <m> + 1)$$

Given that the validity range of new keys should not overlap with the validity range of a revoked key, the certificate can be generated with an inception timestamp that indicates a start and end time that takes place in the future. In general, this is not a problem as timestamps are treated by this protocol as purely relative values. That is to say, the validity range can be based upon a plurality of values, provided there is a mechanism to determine the start and end of the range and if the relative validity ranges of the multiple signers overlap.

Figure 3:
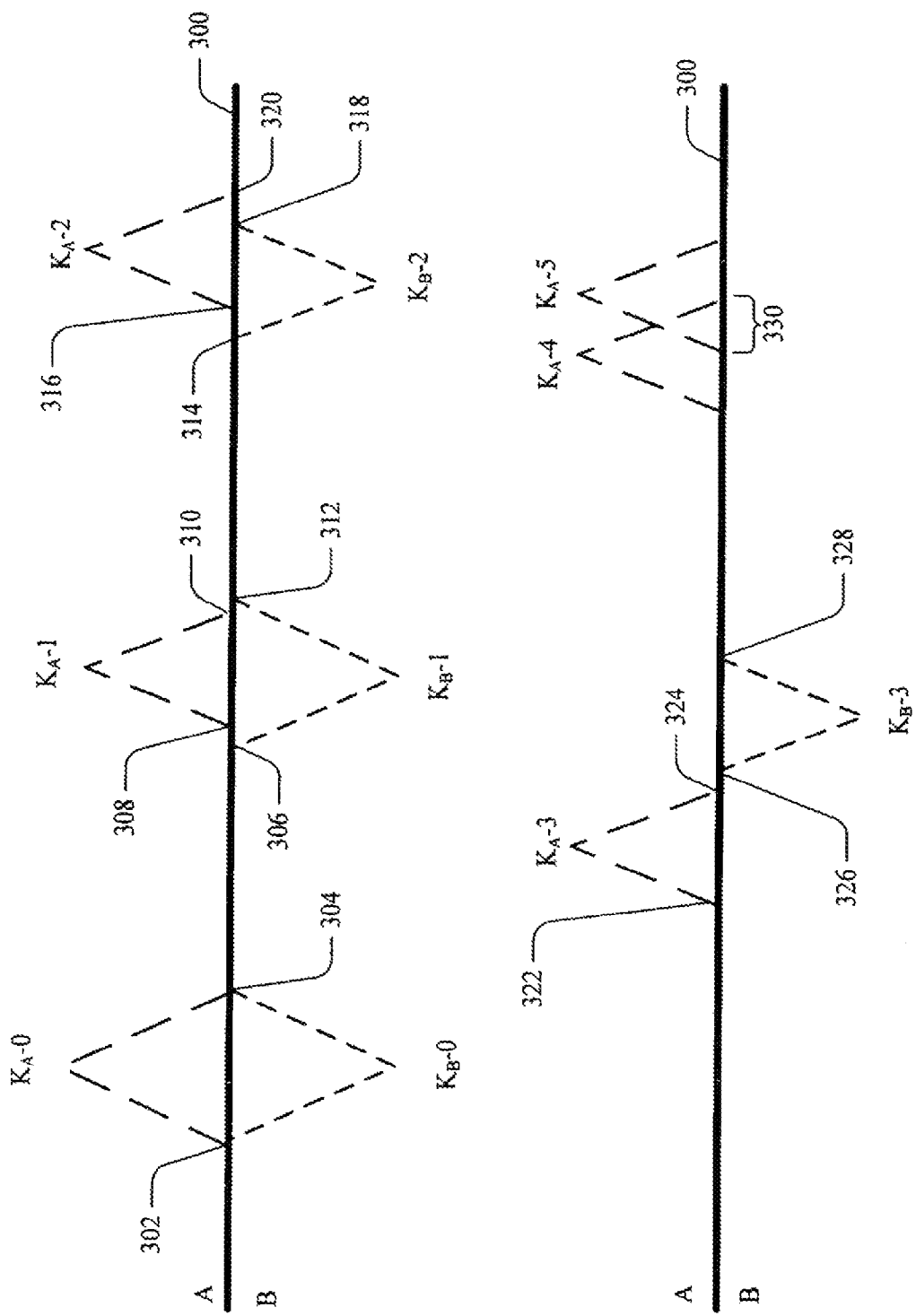
FIG. 3 illustrates validity ranges associated with a multiple party digital signature system.

FIG. 3 is an illustration of validity ranges associated with respective keys. Line 300 is a time representation of a validity range, and real time is used for simplicity of illustration only and not by way of limitation. Two signers illustrated as "A"

and "B," with A's keys represented above line 300 and B's keys represented below line 300.

A has five validity ranges represented as keys $K_A$-0, $K_A$-1, $K_A$-2, $K_A$-3, and $K_A$-4. B has three validity ranges represented as keys $K_B$-0, $K_B$-1, and $K_B$-2. As illustrated, $K_A$-0 and $K_B$-0, have substantially similar validity ranges with a start timestamp at 302 and an end timestamp at 304. Thus, the respective validity ranges $K_A$-0 and $K_{13}$-0 are overlapping and can generate a valid signature of the certificate during that validity range.

The respective validity ranges $K_A$-1 and $K_B$-1 are similarly sufficiently overlapping. $K_B$-1 has a start timestamp 306 that is before $K_A$-1's start timestamp 308. However, $K_A$-1's end timestamp 310 is before $K_B$-1's end timestamp 312. However, because $K_B$-1's validity range sufficiently overlaps $K_A$-1's validity range it allows for generation of a valid signature. Thus, the validity ranges do not have to be equally overlapping or have the same start timestamp and same end timestamp to be valid.

$K_A$-2 and $K_B$-2 illustrate partially overlapping validity ranges. $K_B$-2 has a start timestamp 314 that is before $K_A$-2's start timestamp 316 and $K_B$-2's end timestamp 318 expires before $K_A$-2's end time stamp 320. The overlapping range in which a valid signature can be generated is between $K_A$-2's start time stamp 316 and $K_B$-2's end time stamp 318.

$K_A$-3 and $K_B$-3 illustrate non-overlapping validity ranges. $K_A$-3 has a start time stamp 322 and an end time stamp 324 that are distinct from $K_B$-3's start time stamp 326 and end time stamp 328. Thus, $K_A$-3 and $K_B$-3 are not overlapping and generation of a valid signature for A and/or B is not possible during validity ranges $K_A$-3 and $K_B$-3.

It should be noted that the validity ranges should be disjoint. For example, validity ranges $K_A$-0, $K_A$-1 and $K_A$-2 are disjoint. However, validity ranges $K_A$-4 and $K_A$-5 are not disjoint. That is the validity ranges $K_A$-4 and $K_A$-5 overlap at 330. Thus, A cannot validly sign a certificate during validity ranges $K_A$-4 and $K_A$-5.

Since the validity range of multiple party signatures should overlap during the same validity range, signatures that do not overlap cannot create a valid signature. For example, $K_A$-0 cannot create a valid signature with $K_B$-1 and/or $K_B$-2. Likewise, $K_B$-1 cannot create a valid signature with $K_A$-0 and/or $K_A$-2. The other keys operate in a similar fashion.

Figure 4:
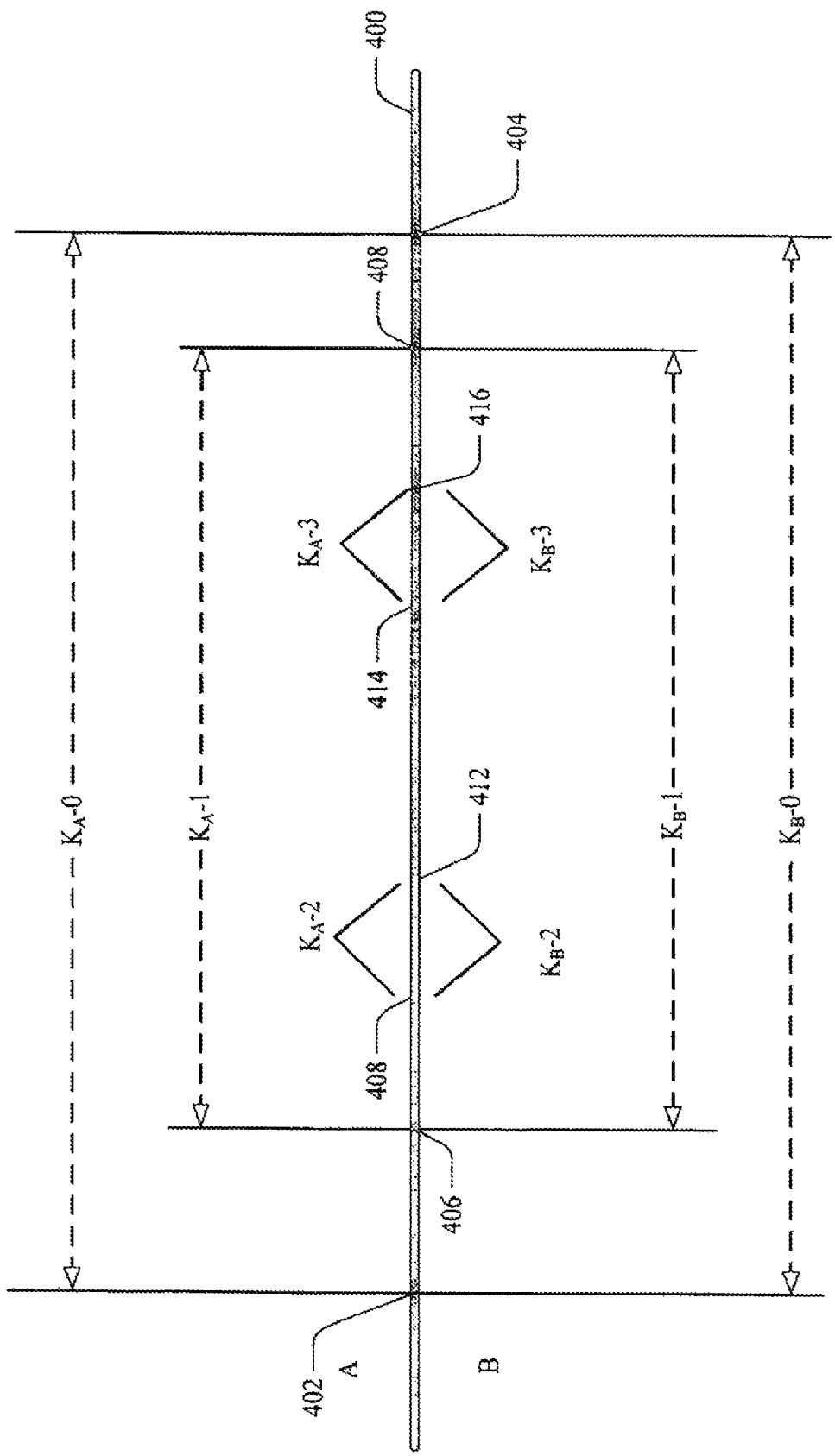
FIG. 4 illustrates a hierarchy protocol for multiple party digital signatures.

Referring now to FIG. 4 a certification hierarchy 400 is illustrated. Certification hierarchy 400 includes parent key $K_A$-0 and child keys $K_A$-1, $K_A$-2, and $K_A$-3 contained within the validity range of parent key $K_A$-0. While a certification hierarchy is in force, the validity range of each child key $K_A$-1, $K_A$-2, and $K_A$-3 is entirely contained in the validity range of its parent $K_A$-0. Child keys $K_A$-1, $K_A$-2, and $K_A$-3 that do not meet this condition are not trusted. A compromise at any point in the hierarchy necessitates the revocation and regeneration of that key. The new key, as per a key management criteria, is assigned a validity range that does not overlap with the previous key. Thus, the child keys are also recursively revoked and regenerated.

It can be argued that the more often a key is used, the more it is exposed to potential compromise. Therefore, a certification hierarchy of several levels can be utilized when implementing this protocol. Keys at a higher level are longer lived, while keys at lower levels are regenerated more frequently. For example, a three level hierarchy may use root keys with a lifetime of one decade, intermediate keys with an intermediate level lifetime of one year, and interval duration keys with a lower level lifetime of one month. In this case, the maximum time an undetected compromise of a lower level key (arguably the most exposed) could be exploited for is one month.

With continuing reference to FIG. 4, an entity, A, has validity ranges $K_A$-0, $K_A$-1, $K_A$-2 and $K_A$-3 represented above line 400. An entity, B, has validity ranges $K_B$-0, $K_B$-1, $K_B$-2 and $K_B$-3 represented below line 400. It should be appreciated that line 400 represents a value that can be used for validity range purposes and by way of illustration and not limitation, is described as a time line. For simplicity purposes, the validity ranges of A and B are shown as encompassing the same range, however, it should be appreciated that the validity ranges may be different, provided they sufficiently overlap.

Entity A of the hierarchy 400 includes a root key $K_A$-0, an intermediate key $K_A$-1, and interval duration keys $K_A$-2 and $K_A$-3. Similarly, B has a root key $K_B$-0, an intermediate key $K_B$-1, and interval duration keys $K_B$-2 and $K_B$-3. The root keys and intermediate keys can also reside at a server when various computations are performed. Root keys $K_A$-0 and $K_B$-0 are at respective primary levels and associated with respective certificate authorities. Root keys $K_A$-0 and $K_B$-0 can be valid for a substantially indefinite range of time, as illustrated at start timestamp 402 and end timestamp 404.

Validity ranges $K_A$-1 and $K_B$-1 are of a lesser duration and have start timestamp 406 and end timestamp 408. $K_A$-1 and $K_B$-1 are sufficiently included in the validity range of $K_A$-0 and $K_B$-0. That is to say, the validity ranges of $K_A$-0 and $K_B$-0 are longer in duration than the validity ranges of $K_A$-1 and $K_B$-1. For example, root keys $K_A$-0 and $K_B$-0 can have a validity range of ten years and intermediate keys $K_A$-1 and $K_B$-1 can have validity ranges of one year, for example.

The validity ranges of duration keys $K_A$-2, $K_A$-3, $K_B$-2, and $K_B$-3 fall within respective validity ranges of $K_A$-1 and $K_B$-1. The duration keys can have a validity range less than the validity range of intermediate keys, for example, one week. Thus, because they are included in the validity range of both the intermediate key(s) and root(s), the certification hierarchy is satisfied.

Certificate hierarchy can be supported by various standards, including X.509 and OpenPGP. However, the embodiments disclosed herein can be implemented utilizing a plurality of hierarchy standards and is not limited to X.509 and/or OpenPGP.

A web of trust is more general than a strict certification hierarchy. In general, each certificate can have more than one certifier, and the trust relationships form a directed graph. This protocol can be implemented with a web of trust by applying the constraint that the validity range of certificates are entirely contained by those of its certifiers. This implies that the trust web is acyclical unless the validity ranges of the keys are congruent. OpenPGP is an example of one standard that supports webs of trust and can be utilizing according to one or more of the disclosed embodiments.

Figure 5:
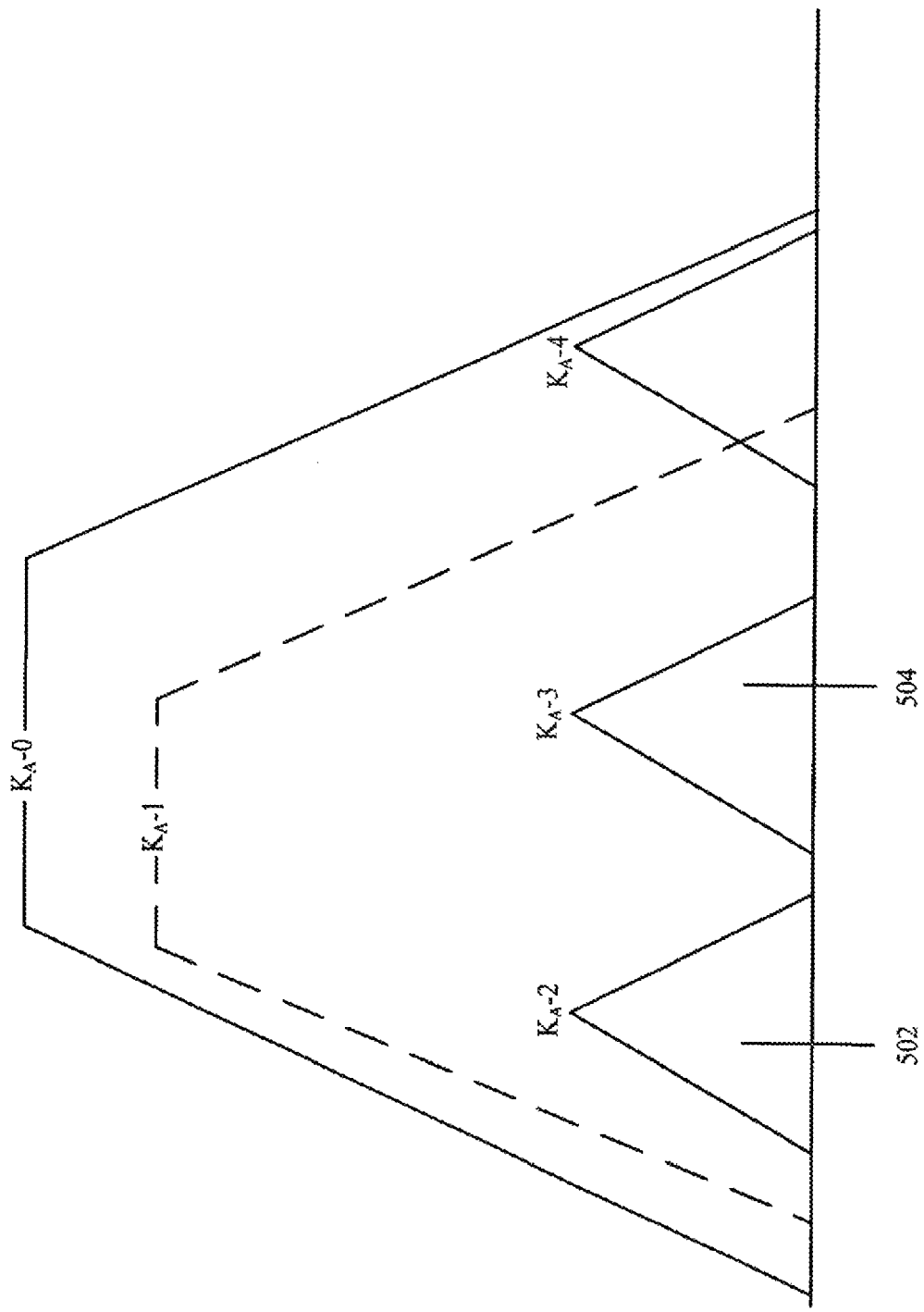
FIG. 5 is a hierarchy protocol for multiple party digital signatures.

Referring now to FIG. 5 a hierarchy protocol for multiple party signatures is illustrated. The hierarchy is discussed in relation to a first entity, A, that has a root key $K_A$-0, intermediate key $K_A$-1, and three duration keys $K_A$-2, $K_A$-3, and $K_A$-4. If a certification hierarchy is in force, the validity range of each certificate $K_A$-2 and $K_A$-3 is entirely contained in the validity range of its parent $K_A$-1 and $K_A$-0, and is thus valid. However, the certificate of key $K_A$-4 is outside the hierarchy of parent key $K_A$-1 and thus, is not a valid certificate under a hierarchy protocol. It should be appreciated that the range from 502 to 504 can be verified by key $K_A$-1 itself and/or a duration key.

While the figures and examples discussed herein refer to two sets of keys and/or three levels of keys in a certificate hierarchy, it should be appreciated that there may be more than two sets of keys and more (or less) than three key levels.

Referring to FIGS. 6-10, methodologies relating to multiple party signatures are illustrated. While, for purposes of simplicity of explanation, the methodologies are shown and described as a series of acts, it is to be understood and appreciated that the methodologies are not limited by the order of acts, as some acts may, in accordance with these methodologies, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement the following methodologies.

Each signer holds a private key, and publishes a certificate containing the associated public key. Each certificate annotates its key with a start timestamp and an end timestamp. The key is generally valid only in the range between these two instances, known as the validity range.

Signers typically generate sequences of keys and certificates for a given purpose over time, with successive keys replacing those expired or revoked. There is no need for the timestamps to be related to real time (although they may be). However, keys in a sequence should possess disjoint validity ranges. In other words, none of the validity ranges should overlap. The signers should cooperate when generating keys to ensure that the set of keys used contemporaneously do possess overlapping validity ranges.

Each key is used only for a pre-determined lifetime and keys are regularly expired. Note that the validity range of the key is, in general, unrelated to the certificate's end timestamp. Validity range information may or may not be carried in the certificate and may or may not be determinable from the end timestamp. Expired private keys should be destroyed, to reduce the likelihood of old keys being compromised. New signing keys should be generated to replace expired keys; this can happen on or before the end of the validity range.

If a key is compromised or lost, its owner notifies the other signers that the key is revoked. Notification may be by a plurality of mechanisms; a certificate revocation list would be typical. If a certificate revocation is received (and verified), the signer should treat the other key(s) with a validity range overlapping the revoked key as expired. Corresponding private key(s) should be consequently destroyed. This synchronization guarantees that overlapping keys are only used for signing in the absence of revocation notices.

Figure 6:
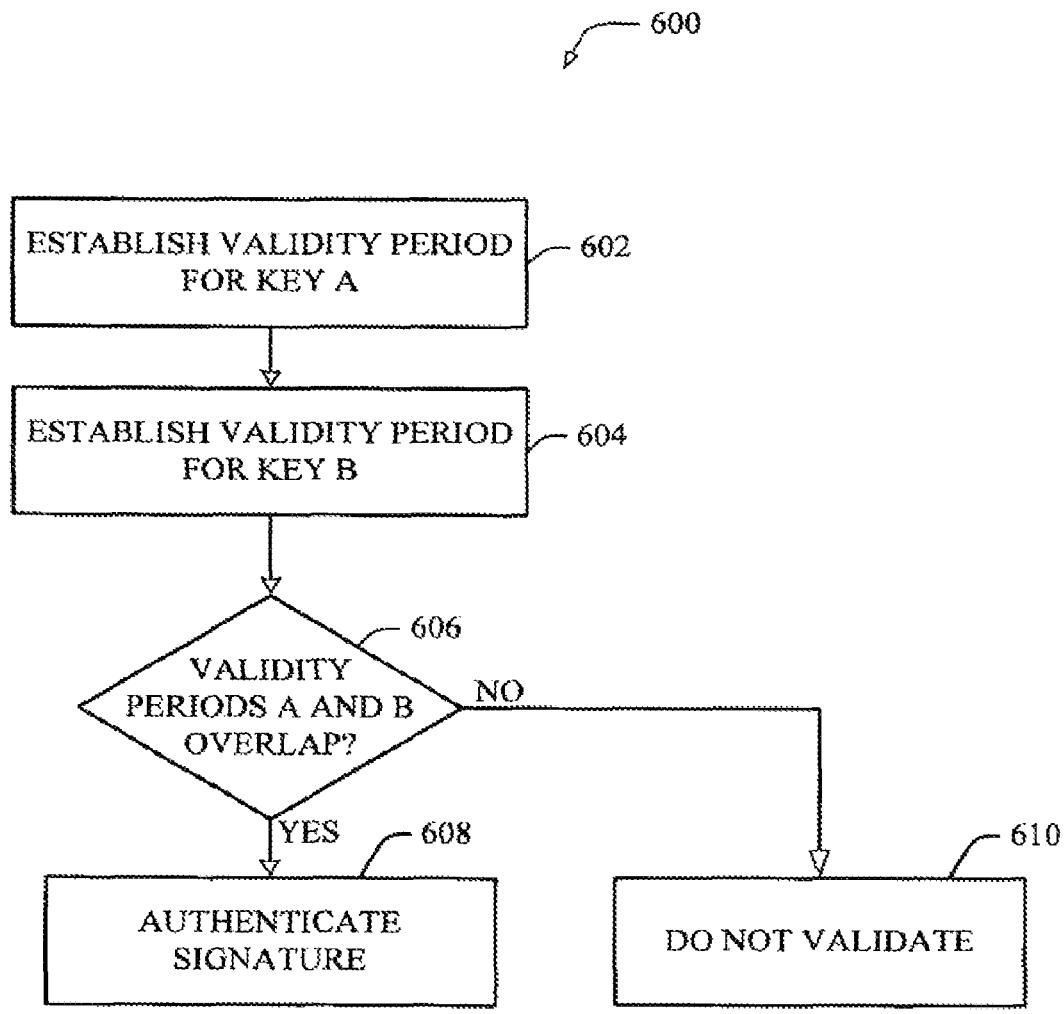
FIG. 6 is a flow diagram of a methodology for creating a valid signature authentication range for different keys for use with multiple party digital signatures.

FIG. 6 is a flow diagraph of a methodology 600 for creating a valid signature authentication range for different keys for use with multiple party signatures. It should be appreciated that while the flow diagram is discussed with regard to a first key, A, and a second key, B, the methodology supports more than two keys and is not limited as such.

At 602, a validity range is established with regard to key A. The validity range has both a start timestamp and an end timestamp. A plurality of means can be utilized to establish the validity range and is not limited to a duration of time, although it is easy to think of a validity range in terms of time. Key A has a public key and an associated private key. This validity range is associated with the public key of a user device and a certificate is signed by such public key.

At least one other party or entity creates key B, at 604, having a public key and a private key. A validity range is established for the public key of key B with both a start timestamp and an end timestamp. A certificate is signed by B's public key and associated validity range.

In order for the certificate that is signed by both A and B to be valid, the respective validity ranges should overlap. A determination is made at 606 whether there is sufficient overlap. That is to say, both validity ranges encompass the same range allowing for toggling or staggering of the start timestamps and end timestamps. Thus, the validity ranges of the keys that sign the certificate do not have to be equal or have the same start timestamp and end timestamp.

If the validity ranges overlap, at 608 the certificate and associated digital signatures are deemed trustworthy. If, however, there is not sufficient overlap of the validity ranges, the certificate is not trustworthy and at 610, it is not validated with trustworthy digital signatures.

Figure 7:
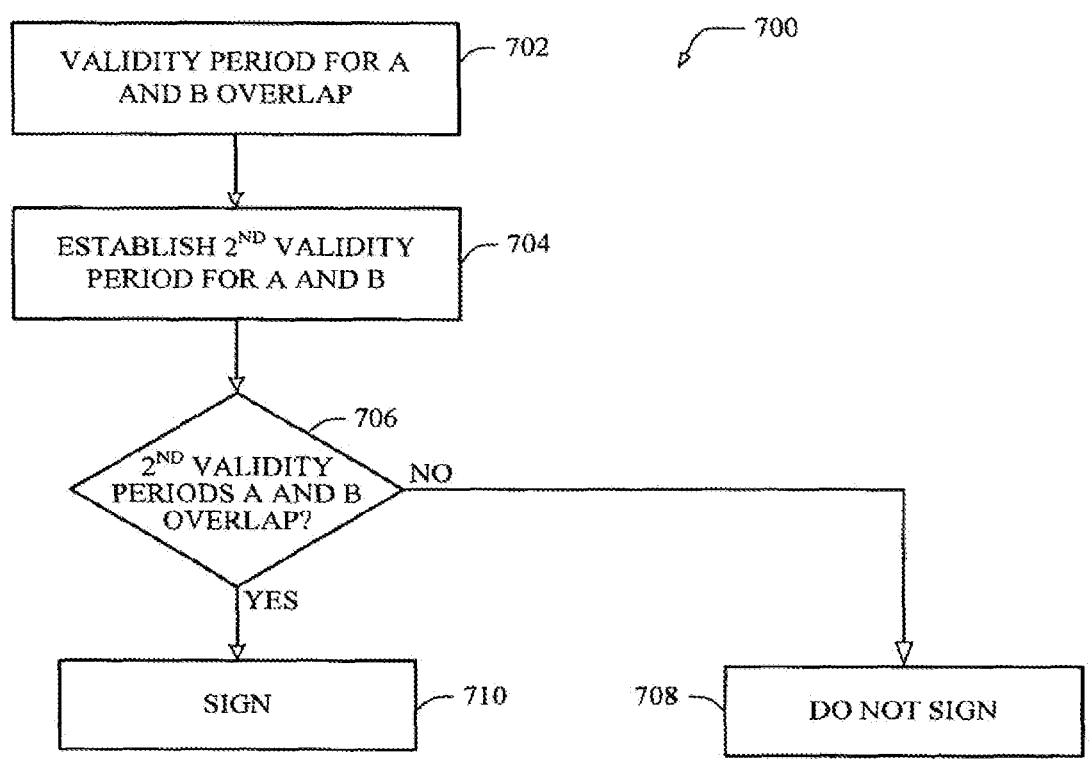
FIG. 7 is a flow diagram of a methodology for generating consecutive validity ranges for a plurality of keys for use with multiple party digital signatures.

FIG. 7 is a flow diagram of a methodology 700 for generating consecutive validity ranges for a plurality of keys for use with multiple party signatures. At 702 validity ranges for at least two entities are created with sufficient overlap, as determined by a methodology, such as the one illustrated and described with regard to FIG. 6. At 704, a second validity range is established. This second validity range is disjoined from the respective first validity ranges. That is to say, there can be no overlap between first validity range and second validity range. It should be noted that a second validity range is created for both entities to avoid, for example, a first validity range of the first entity overlapping both a first and a second validity range of the second entity. If the first validity range of the first entity is overlapping both validity ranges of the second entity and one of the keys is compromised, there is a greater opportunity for the system to be exploited.

At 706 a determination is made whether the second validity ranges of both entities overlap, and can be determined in the same manner as the overlap of the first validity ranges are established. If there is not sufficient overlap, access and signature of the certificate is denied at 708.

If sufficient overlap is determined at 706, access and signature of the certificate is allowed. It should be noted that subsequent validity ranges (e.g. third, fourth, fifth, . . . ) can be established and verified in the same manner as that illustrated and described with reference to first and second validity ranges.

Figure 8:
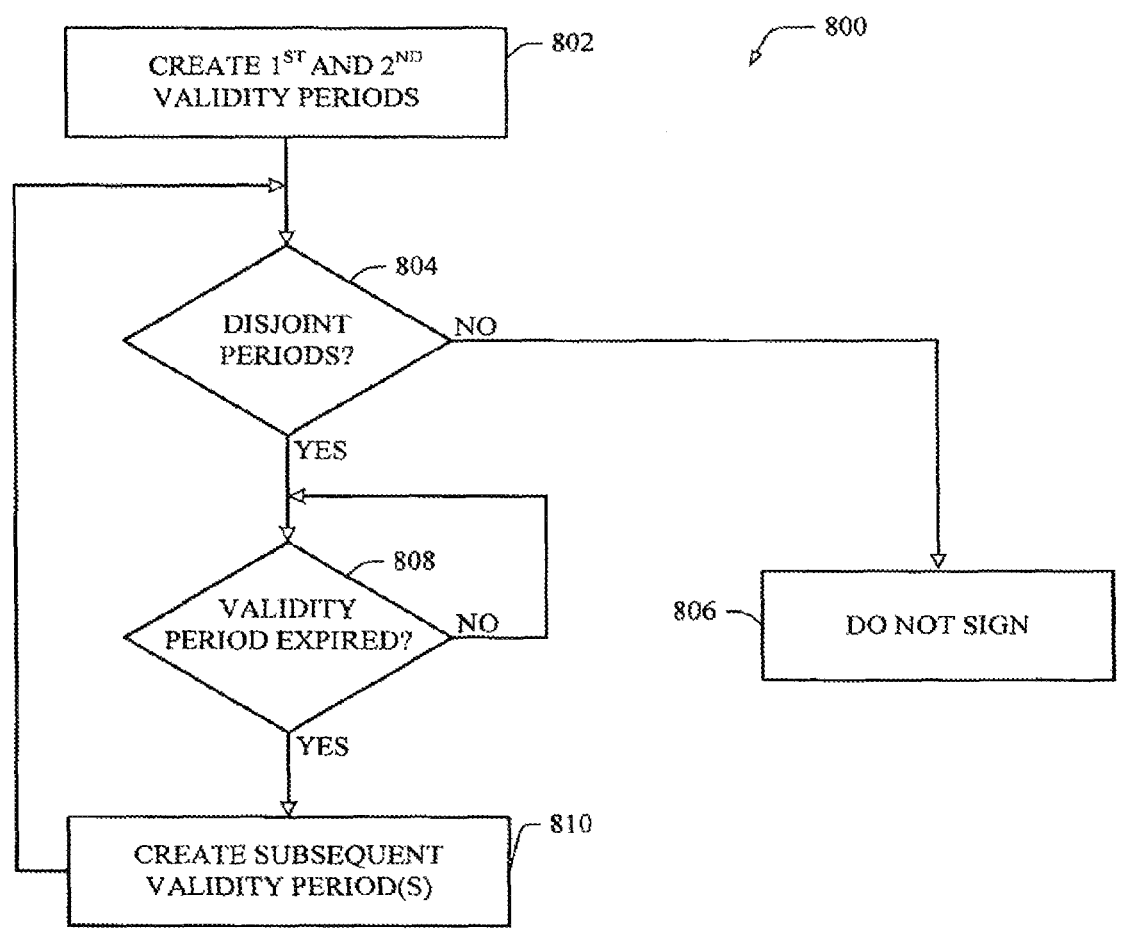
FIG. 8 is a flow diagram of a methodology for establishing consecutive validity ranges for a single key for use with multiple party digital signatures.

FIG. 8 is a flow diagram of a methodology 800 for establishing consecutive validity ranges for a single key for use with multiple party signatures. A first and second validity range associated with a first public key is created at 802. The first and second validity ranges have a start timestamp and an end time stamp. While the creation of the first and second validity ranges is shown at a similar time, it should be understood that the creation of the second (and subsequent) validity ranges can be created before or at a substantially similar time as a validity range expires. That is to say, the second validity range should be created at or before the end timestamp of the first validity range.

At 804, a determination is made whether the first and second validity ranges are disjoint with separate and distinct validity ranges. That is to say, the first and second validity ranges associated with the same public key cannot occur or exist during the same validity range or portion(s) thereof. This may necessitate generating a certificate with an inception timestamp in the future. This is not a problem since timestamps are treated as purely relative values.

If at 804 it is determined that the validity ranges are not disjoint, the certificate, represented by the second validity range, is not associated with a digital signature of this user. If the validity ranges are disjoint, the certificate is digitally signed and can be utilized for verification. If there is overlapping, those overlapping keys are revoked and new keys are regenerated before signing can continue.

At 810, a third, or subsequent validity ranges (e.g. fourth, fifth, sixth . . . ) are created either at or before the time the previous validity range expires. The subsequent validity ranges should be disjoint from previous validity ranges of the preceding validity ranges.

Figure 9:
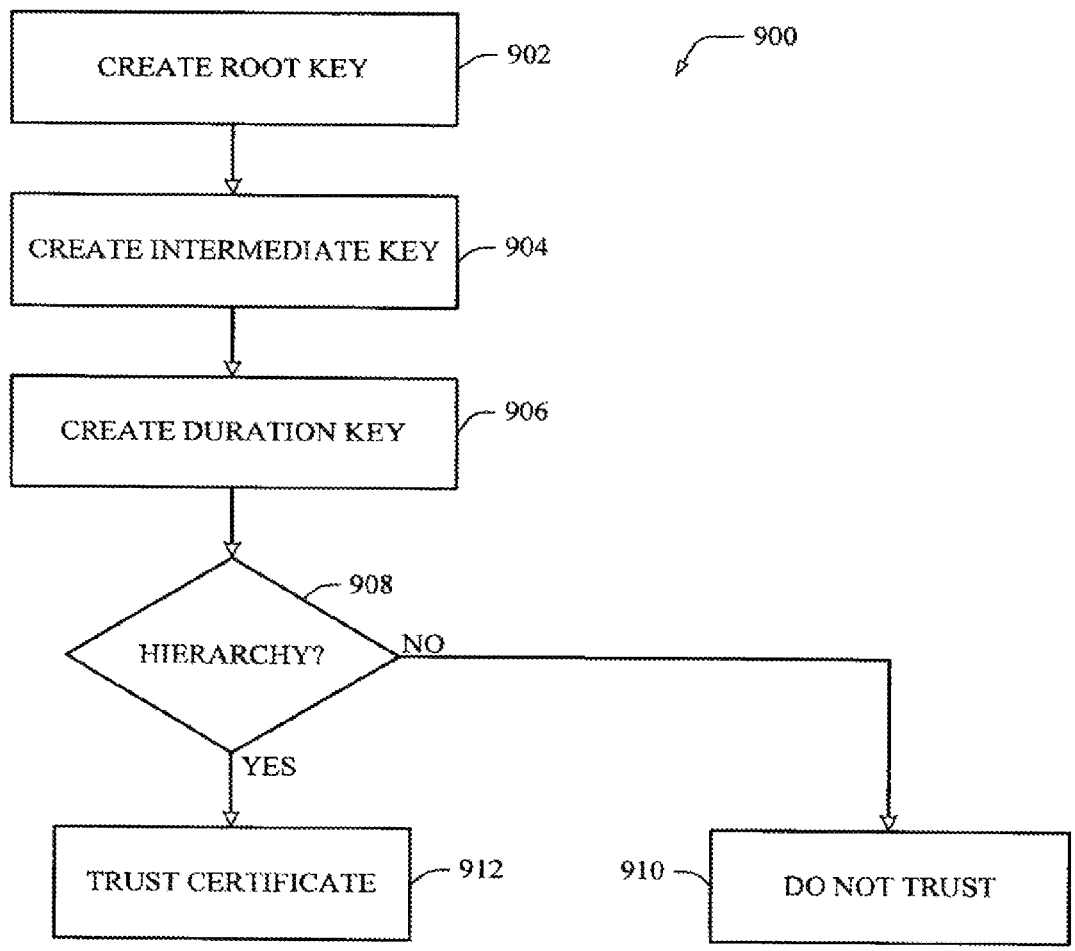
FIG. 9 is a flow diagram of a methodology hierarchy for multiple party digital signatures.

FIG. 9 is a flow diagram of a hierarchy methodology 900 for multiple party signatures. A root key is created at 902, this root key can be stored on both a user device and on a server. The root key contains a start timestamp and an end timestamp. The root key has a longer validity range and can be represented by a number of years, for example.

An intermediate key is created at 904, the intermediate key can be stored both on a user device and on a server. The intermediate key has an associated start timestamp and end timestamp. According to hierarchy protocol, the validity range of the intermediate key should be completely contained in the validity range of the root key. A certificate generated by intermediate key that is not within the validity range of the root key, cannot be trusted. Since the intermediate key has a validity range shorter than that of the root key, it can be represented, for example, by month(s).

A duration key at a third level is created at 906. Duration key has a start timestamp and an end timestamp, which should be contained within the validity ranges of both the root key and the intermediate key. A hierarchy having several layers helps to mitigate potential compromises of the key's integrity. The duration key has a short, expendable time range, and for purposes of illustration, can be represented by a week. Thus, if the duration key is compromised, the longest that this lower level key (and potentially the most exposed) can be compromised and exploited is for is one week.

At 908, a determination is made whether the root key validity range contains the validity range(s) of the intermediate key(s) and if the intermediate key(s) validity range(s) contain the validity range(s) of the duration key(s). If no, then at 910 keys with validity ranges outside the hierarchy cannot be trusted. At this point, that key is revoked and a new key is generated. However, if the determination at 908 is yes, the key can be trusted and at 912 is used to digitally sign certificates.

Figure 10:
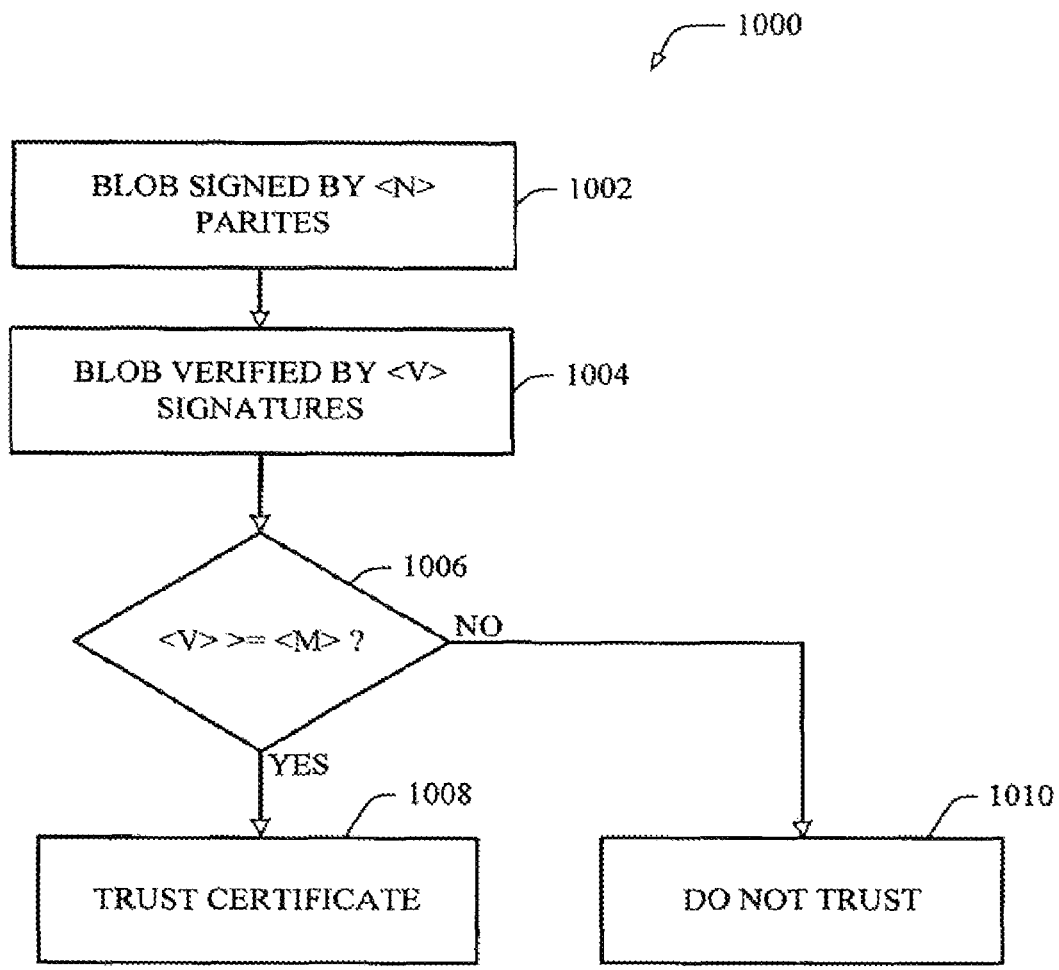
FIG. 10 is a flow diagram of a methodology for verification of multiple party digital signatures.

FIG. 10 is a flow diagram of a methodology 1000 for verification of multiple party signatures. At 1002, a blob is signed by multiple parties creating a signature set of $<n>$ signatures. Each signature is generated independently, in any order, and may be generated at a substantially similar time.

At 1004 the blob is verified by $<v>$ signatures where $<v>$ is the number of correctly verified signatures. Each $<v>$ signature is to be independently verified by using the appropriate certificate. The correct number of signatures can be a number greater than zero and less than or equal to $<n>$.

$$0 \leq <v> \leq <n>$$

A determination is made at 1006 whether there are a minimum number of correct signatures $<m>$ that satisfy the verification policy. That is to say, the verification succeeds if the number of correctly verified signatures $<v>$ is equal to, or more than, the minimum number of correct signatures $<m>$ necessary to verify the certificate.

$$<v> \geq <m>$$

Additionally, for verification to succeed at the time each signature was generated the signer should not have been notified of revocation of one or more of the other keys. If the above two conditions are satisfied, at 1008, the certificate is trusted. If the conditions are not satisfied, the certificate is not trusted at 1010.

Figure 11:
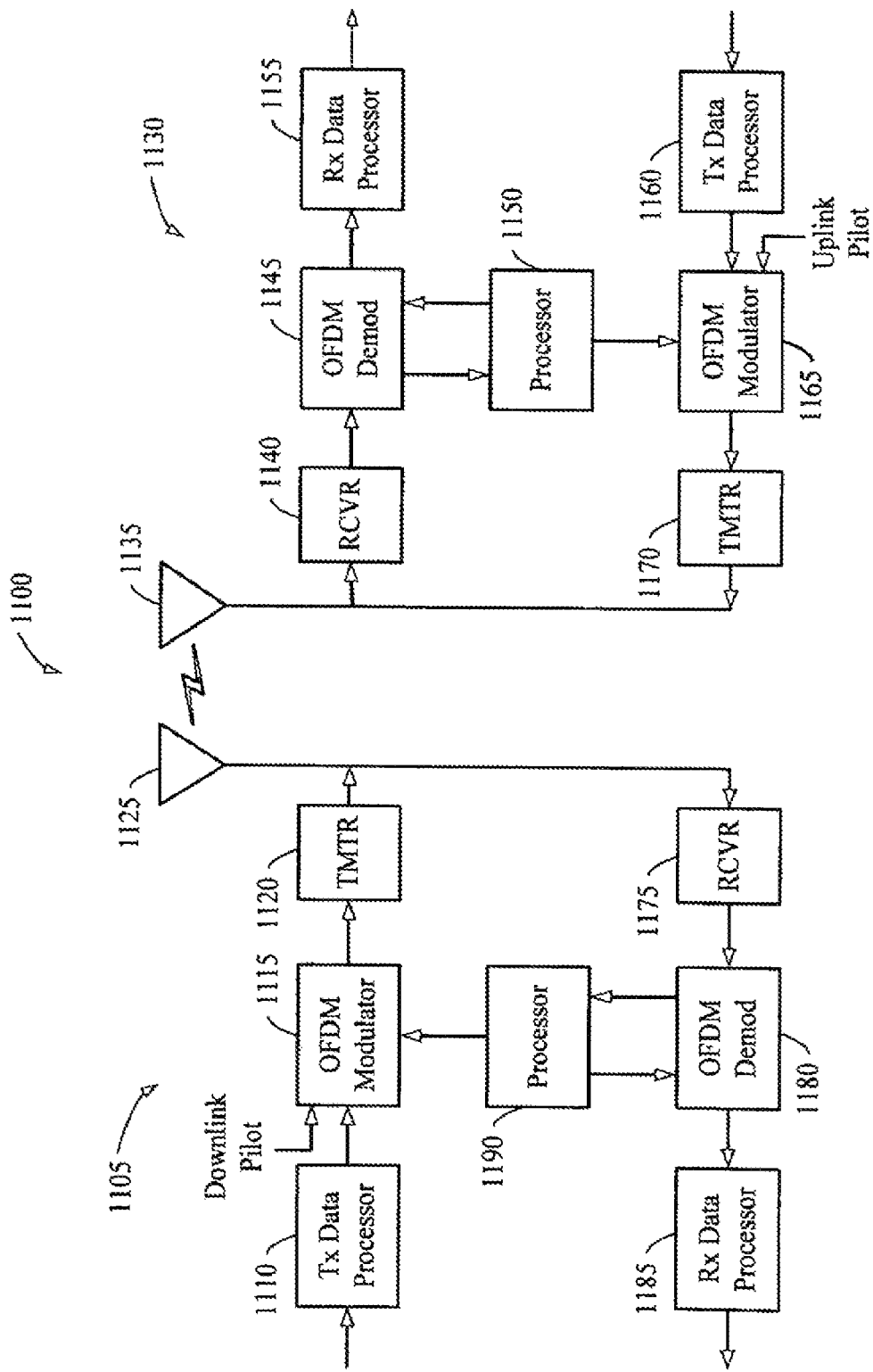
FIG. 11 is an exemplary communication system that can operate in a wireless environment.

FIG. 11 shows an exemplary wireless communication system 1100. The wireless communication system 1100 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-3) and/or methods (FIGS. 6-10) described herein to facilitate wireless communication there between. Although the system is primarily described within the context of an orthogonal frequency multiplex modulation system, it is to be appreciated that any suitable protocol/system (e.g., code division multiplex access (CDMA)) may be employed in connection with the various embodiments described herein.

Referring now to FIG. 11, on a downlink, at access point 1105, a transmit (TX) data processor 1110 receives, formats, codes, interleaves, and modulates (or symbol maps) traffic data and provides modulation symbols ("data symbols"). An OFDM modulator 1115 receives and processes the data symbols and pilot symbols and provides a stream of OFDM symbols. An OFDM modulator 1120 multiplexes data and pilot symbols on the proper subbands, provides a signal value of zero for each unused subband, and obtains a set of N transmit symbols for the N subbands for each OFDM symbol period. Each transmit symbol may be a data symbol, a pilot symbol, or a signal value of zero. The pilot symbols may be sent continuously in each OFDM symbol period. Alternatively, the pilot symbols may be time division multiplexed (TDM), frequency division multiplexed (FDM), or code division multiplexed (CDM). OFDM modulator 1120 can transform each set of N transmit symbols to the time domain using an N-point IFFT to obtain a "transformed" symbol that contains N time-domain chips. OFDM modulator 1120 typically repeats a portion of each transformed symbol to obtain a corresponding OFDM symbol. The repeated portion is known as a cyclic prefix and is used to combat delay spread in the wireless channel.

A transmitter unit (TMTR) 1120 receives and converts the stream of OFDM symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. An OFDM demodulator 1145 removes the cyclic prefix appended to each OFDM symbol, transforms each received transformed symbol to the frequency domain using an N-point FFT, obtains N received symbols for the N subbands for each OFDM symbol period, and provides received pilot symbols to a processor 1150 for channel estimation. OFDM demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by OFDM demodulator 1145 and RX data processor 1155 is complementary to the processing by OFDM modulator 1115 and TX data processor 1110, respectively, at access point 1100.

On the uplink, a TX data processor 1160 processes traffic data and provides data symbols. An OFDM modulator 1165 receives and multiplexes the data symbols with pilot symbols, performs OFDM modulation, and provides a stream of OFDM symbols. The pilot symbols may be transmitted on subbands that have been assigned to terminal 1130 for pilot transmission, where the number of pilot subbands for the uplink may be the same or different from the number of pilot subbands for the downlink. A transmitter unit 1170 then receives and processes the stream of OFDM symbols to generate an uplink signal, which is transmitted by the antenna 1135 to the access point 1110.

At access point 1110, the uplink signal from terminal 1130 is received by the antenna 1125 and processed by a receiver unit 1175 to obtain samples. An OFDM demodulator 1180 then processes the samples and provides received pilot symbols and data symbol estimates for the uplink. An RX data processor 1185 processes the data symbol estimates to recover the traffic data transmitted by terminal 1135. A processor 1190 performs channel estimation for each active terminal transmitting on the uplink. Multiple terminals may transmit pilot concurrently on the uplink on their respective assigned sets of pilot subbands, where the pilot subband sets may be interlaced.

Processors 1190 and 1150 direct (e.g., control, coordinate, manage, etc.) operation at access point 1110 and terminal 1135, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access OFDM system (e.g., an orthogonal frequency division multiple-access (OFDMA) system), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, processors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

What has been described above includes examples of one or more embodiments. It is, of course, not possible to describe every conceivable combination of components or methodologies for purposes of describing these embodiments, but one of ordinary skill in the art may recognize that many further combinations and permutations of such embodiments are possible. Accordingly, the embodiments described herein are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of verifying multiple party digital signatures, comprising:
   receiving, at a verifier device, a block of data and a set of signatures for the block of data by multiple parties;
   verifying a validity of at least a subset of signatures from the set of signatures for the block data to obtain the verified signatures, wherein the subset of signatures is successfully verified if all signatures in at least the subset of signatures have overlapping time-restricted validity ranges;
   verifying, at a verifier device, the block of data with a correct number of verified signatures; and
   determining if the number of verified signatures satisfies a verification policy.

2. The method of claim 1, further comprising:
   trusting the block of data if the number of verified signatures satisfies the verification policy.

3. The method of claim 1, further comprising:
   denying trust to the block of data if the number of verified signatures does not satisfy the verification policy.

4. The method of claim 1, wherein the number of verified signatures that satisfies the verification policy is a predefined number of signatures less than the number of signers.

5. The method of claim 4, wherein the number of verified signatures is less than the number of multiple parties that signed the block of data.

6. The method of claim 1, wherein revocation of at least one key associated with at least one of the multiple parties that signed the block of data prevents further signing until all multiple parties have regenerated new keys.

7. The method of claim 1, wherein each signature is generated by a party signing the block of data with a corresponding, time-restricted, private key, and the method further comprising:
   verifying that each signature is signed with a corresponding, time-restricted, public key.

8. The method of claim 1, wherein the validity of the overlapping time-restricted validity ranges is measured at the time each signature is generated.

9. The method of claim 1, further comprising:
   ascertaining a validity range in which a certificate for the block of data is valid based upon predetermined validity ranges for the set of signatures; and
   monitoring the predetermined validity ranges and invalidating the certificate upon expiration of at least one of the predetermined validity ranges for the set of signatures.

10. The method of claim 9, wherein the block of data cosigned by the multiple parties.

11. The method of claim 9, wherein the block of data countersigned by the multiple parties.

12. The method of claim 9, wherein the block of data is cross-signed by the multiple parties.

13. The method of claim 9, wherein the validity ranges generated by an individual signer are non-overlapping.

14. The method of claim 9, wherein each signature is accompanied by a start time stamp and end time stamp used to define their validity range.

15. The method of claim 1, wherein the verification policy defines that all signatures in the set of signatures be successfully verified and that those verified signatures be valid for the overlapping time-restricted validity range.

16. The method of claim 1, wherein the verification policy defines that a subset of signatures in the set of signatures be successfully verified and that subset of verified signatures be valid for the overlapping time-restricted validity range.

17. A verifier device comprising:
- a receiver adapted to receive a block of data and a set of signatures for the block of data by multiple parties;
- a processor coupled to the receiver, the processor adapted to:
  - verify a validity of at least a subset of signatures from the set of signatures for the block data to obtain the verified signatures, wherein the subset of signatures is successfully verified if all signatures in at least the subset of signatures have overlapping time-restricted validity ranges;
  - verify the block of data with a correct number of verified signatures; and
  - determine if the number of verified signatures satisfies a verification policy.

18. The verifier device of claim 17, wherein the processor is further adapted to:
- ascertain a validity range in which a certificate for the block of data is valid based upon predetermined validity ranges for the set of signatures; and
- monitor the predetermined validity ranges and invalidating the certificate upon expiration of at least one of the predetermined validity ranges for the set of signatures.

19. The verifier device of claim 18, wherein the validity ranges generated by an individual signer are non-overlapping.

20. The verifier device of claim 17, wherein the validity of the overlapping time-restricted validity ranges is measured at the time each signature is generated.

21. A verifier device comprising:
- means for receiving a block of data and a set of signatures for the block of data by multiple parties;
- means for verifying a validity of at least a subset of signatures from the set of signatures for the block data to obtain the verified signatures, wherein the subset of signatures is successfully verified if all signatures in at least the subset of signatures have overlapping time-restricted validity ranges;
- means for verifying the block of data with a correct number of verified signatures; and
- means for determining if the number of verified signatures satisfies a verification policy.

22. A non-transitory machine-readable medium comprising instructions for verifying a block of data, which when executed by one or more processors causes the one or more processors to:
- receive a block of data and a set of signatures for the block of data by multiple parties;
- verify a validity of at least a subset of signatures from the set of signatures for the block data to obtain the verified signatures, wherein the subset of signatures is successfully verified if all signatures in at least the subset of signatures have overlapping time-restricted validity ranges;
- verify the block of data with a correct number of verified signatures; and
- determine if the number of verified signatures satisfies a verification policy.

* * * * *